United States Patent
Li et al.

(10) Patent No.: US 8,446,971 B2
(45) Date of Patent: May 21, 2013

(54) COMMUNICATION STATION AND METHOD FOR EFFICIENTLY PROVIDING CHANNEL FEEDBACK FOR MIMO COMMUNICATIONS

(75) Inventors: Qinghua Li, San Ramon, CA (US); Huaning Niu, Milpitas, CA (US); Xintian E Lin, Palo Alto, CA (US); Yuan Zhu, Beijing (CN); Thomas J. Kenney, Portland, OR (US); Eldad Perahia, Portland, OR (US); Honggang Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 326 days.

(21) Appl. No.: 12/861,685

(22) Filed: Aug. 23, 2010

(65) Prior Publication Data

US 2012/0045003 A1     Feb. 23, 2012

(51) Int. Cl.
*H04L 27/28*     (2006.01)
(52) U.S. Cl.
USPC ........................................... 375/260
(58) Field of Classification Search
USPC ................... 375/260, 267, 299, 347
See application file for complete search history.

(56) References Cited

U.S. PATENT DOCUMENTS

| 2007/0195974 A1 | 8/2007 | Li et al. |
| 2008/0049709 A1 | 2/2008 | Pan et al. |
| 2008/0108310 A1* | 5/2008 | Tong et al. ................. 455/69 |
| 2009/0154588 A1* | 6/2009 | Chen et al. ................. 375/267 |
| 2010/0091892 A1 | 4/2010 | Gorokhov |
| 2010/0091893 A1* | 4/2010 | Gorokhov .................. 375/260 |
| 2010/0226455 A1* | 9/2010 | Porat et al. ................. 375/267 |
| 2011/0255613 A1 | 10/2011 | Xia et al. |
| 2011/0255629 A1 | 10/2011 | Ko et al. |

FOREIGN PATENT DOCUMENTS

| EP | 1819088 A2 | 8/2007 |
| WO | WO-2012027060 A2 | 3/2012 |
| WO | WO-2012027060 A3 | 3/2012 |

OTHER PUBLICATIONS

"International Application Serial No. PCT/US2011/045754, International Search Report mailed Feb. 17, 2012", 5 pgs.
"International Application Serial No. PCT/US2011/045754, Written Opinion mailed Feb. 17, 2012", 4 pgs.

* cited by examiner

*Primary Examiner* — Kevin Kim
(74) *Attorney, Agent, or Firm* — Schwegman, Lundberg & Woessner, P.A.; Gregory J. Gorrie

(57) ABSTRACT

Embodiments of a communication station and methods for efficiently providing channel feedback for MIMO communications over an OFDM channel are generally described herein. In some embodiments, receiving stations may perform a recursive differential quantization of channel information across time and/or frequency to generate quantized differential channel feedback. The quantized differential channel feedback from each receiving station may be used by a transmitting station to precode MIMO transmissions to one or more of the receiving stations. The quantized differential channel feedback may be either a quantized differential channel matrix or a quantized differential beamforming matrix.

26 Claims, 3 Drawing Sheets

COMMUNICATION STATION AND METHOD FOR EFFICIENTLY PROVIDING CHANNEL FEEDBACK FOR MIMO COMMUNICATIONS

TECHNICAL FIELD

Embodiments pertain to wireless communications including wireless-fidelity (WiFi) communications. Some embodiments relate to multiple-output (MIMO) communications, including single-user MIMO (SU-MIMO), multi-user MIMO (MU-MIMO) and cooperative MIMO communications. Some embodiments pertain to MU-MIMO systems that operate in accordance with one of the IEEE 802.11 standards, such as the IEEE 802.11ac upcoming standard.

BACKGROUND

MIMO communications make use of multiple antennas at both the transmitter and receiver to improve communication performance. SU-MIMO systems may to transmit and receive signals to/from a single station using two or more antennas, while MU-MIMO systems use multiple spatial channels to transmit and receive signals to/from multiple stations at the same time using two or more antennas. In a MU-MIMO system, the signals for the different stations are precoded for transmission on different spatial channels. The precoding allows the receiving stations to separate out the data intended for a particular station. The precoding of signals for MU-MIMO transmission utilizes the feedback of channel information, such as a channel matrix or a beamforming matrix. One issue with this channel feedback is the large amount of overhead associated with transmitting the feedback back to the transmitting station. Due to the size of the feedback, the available channel throughput may be reduced. Another issue with this feedback is the processing overhead associated with generating the channel feedback. Generating and transmitting the feedback increases the power consumption of the stations.

Thus, there are general needs for communication stations and methods for efficiently providing channel feedback for MIMO communications. There are also general needs for communication stations and methods for efficiently providing channel feedback that reduce both channel overhead and processing overhead.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
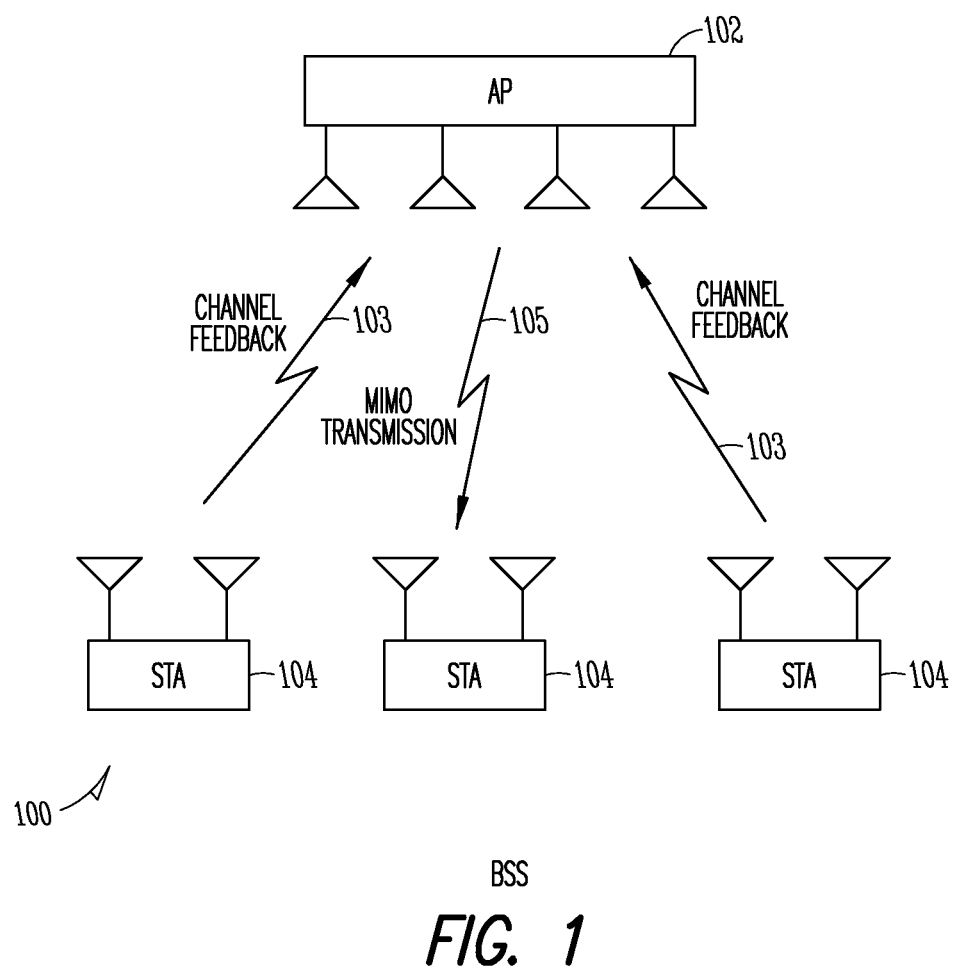
FIG. 1 illustrates a basic service set (BSS) in accordance with some embodiments.

FIG. 1 illustrates a BSS in accordance with some embodiments. BSS 100 includes an access point (AP) 102 and a plurality of associated communication stations (STA) 104. In accordance with embodiments, the access point 102 is configured to transmit data frames to one or more of stations 104 using a MIMO technique. In some embodiments, the data frames may be a MIMO transmission 105. In some MU-MIMO embodiments, the data frames may be a MU-MIMO transmission, which may comprise a concurrent transmission of spatially-separated data packets to at least some of the stations 104. The spatially-separated data packets may comprise a plurality of individual data packets, transmitted concurrently within the same frequency spectrum. Each data packet may be separately precoded for receipt by the receiving stations. MU-MIMO communications may use a downlink space-division multiple access (DL-SDMA) technique.

In accordance with embodiments, the correlation between adjacent channel or beamforming matrices is exploited for reducing overhead and complexity. Stations 104 may provide channel feedback 103 to the access point 102 to allow the access point 102 to precode the data packets of the MIMO transmission 105. The channel feedback may comprise quantized differential channel feedback comprising either channel state information or beamforming information. The quantized differential channel feedback may be quantized differentially across time or across frequency. In some embodiments, the quantized differential channel feedback may be quantized differentially across both time and frequency time. This differential quantization of channel feedback may significantly reduce the amount of feedback, particularly for MU-MIMO communications. These embodiments are described in more detail below.

One issue with conventional systems, such as IEEE 802.11n systems, is that there is no differential quantization and the channel and beamforming matrices are generally quantized independently for each subcarrier. The correlation across subcarriers is thus ignored. In accordance with embodiments, the correlation across subcarriers is exploited for reducing feedback overhead and quantization complexity. In some optional embodiments, differential quantization may also be applied to a single subcarrier to reduce quantization complexity at the cost of a slightly higher overhead. These embodiments are described in more detail below.

The spatially-separated data packets that comprise a MU-MIMO transmission may be transmitted concurrently on the same frequency channel, which may comprise the same set of orthogonal frequency division multiplexed (OFDM) frequency subcarriers. Each of the data packets may be addressed to and precoded for receipt by one of the stations 104. In these embodiments, the individual data packets may be transmitted at the same time and each data packet may be transmitted on a different spatial channel. In these embodiments, the data packets of the MU-MIMO transmission may be specifically precoded for receipt by one of the stations based on quantized differential channel feedback provided by each station.

In some embodiments, two or more streams may be transmitted by the access point 102 in accordance with a MU-MIMO technique. Each stream may comprise packets precoded for receipt by one or more of stations 104. In other embodiments, a single stream may be transmitted in accordance with a SU-MIMO technique to a single one of the stations 104.

In some embodiments, a single frequency channel comprising a plurality of OFDM subcarriers may be used to transmit the MIMO transmission 105. In some IEEE 802.11 ac embodiments, a primary frequency channel and up to seven secondary frequency channels may be used to transmit the MIMO transmission 105. Each frequency channel, for example, may be a 20-MHZ frequency channel and may use a predetermined set of OFDM subcarriers.

The access point 102 and the stations 104 of BSS 100 may implement a carrier-sense multiple access technique (CSMA) for accessing the wireless medium, such as the carrier-sense multiple access with collision avoidance (CSMA/CA) technique of IEEE 802.11. In some embodiments, the MIMO transmission 105 may be transmitted as a single frame by the access point 102 in accordance with the CSMA/CA technique. The access point 102 may receive individual acknowledgements, such as block acknowledgements (BA), from the stations 104 to indicate receipt of the data packet. The acknowledgements may be transmitted by the stations 104 in accordance with a CSMA/CA technique on the same frequency channel in response to receipt of the MIMO transmission 105.

The MIMO transmission 105 may be a single frame that may include, among other things, one or more training fields and one or more signaling fields. The MIMO transmission 105 may be configured in accordance with an IEEE 802.11 standard, such as the IEEE 802.11ac upcoming standard.

In some embodiments, access point 102 and stations 104 may utilize up to four or more antennas for MIMO communications. In some embodiments, the access point 102 and stations 104 may utilize quantized differential channel information for MIMO communications. In other embodiments, the access point 102 and stations 104 may utilize quantized differential beamforming information for MIMO communications.

In some embodiments, stations 104 may be a fixed or mobile wireless communication device, such a personal digital assistant (PDA), a laptop or portable computer with wireless communication capability, a smart phone, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly. The access point 102 and stations 104 may include several separate functional elements to implement the operations described herein, including a radio transceiver, processing circuitry and memory. One or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein.

Figure 2:
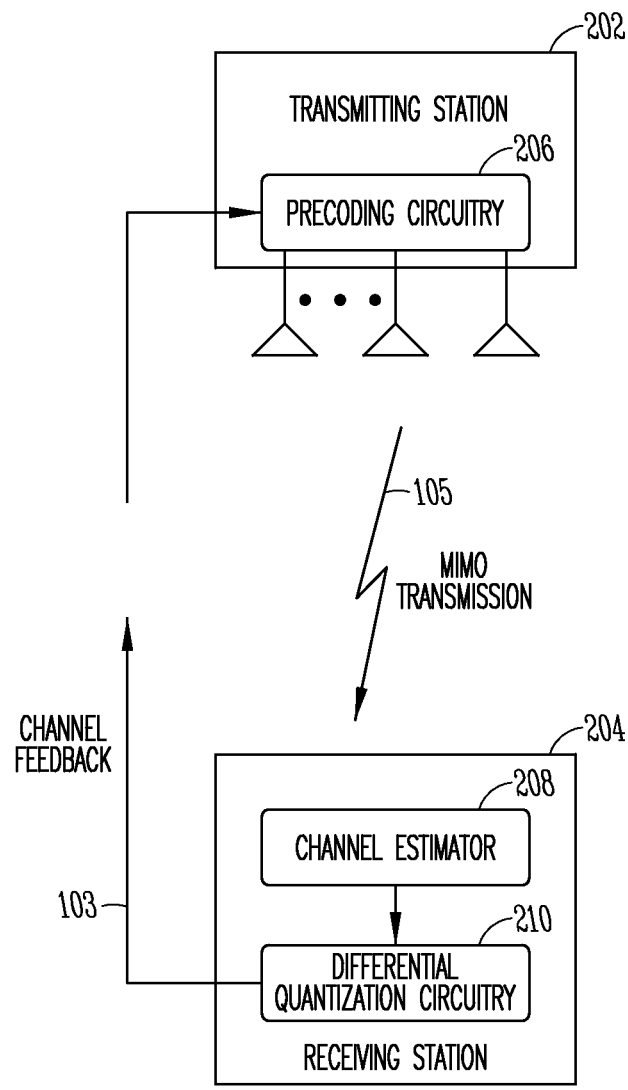
FIG. 2 illustrates a transmitting station and a receiving station in accordance with some embodiments.

FIG. 2 illustrates a transmitting station and a receiving station in accordance with embodiments. Transmitting station 202 may be suitable for use as access point 102 (FIG. 1) or any of the stations 104 (FIG. 1). Receiving station 204 may also be suitable for use as access point 102 (FIG. 1) or any of the stations 104 (FIG. 1). In general, transmitting station 202 is configured to a precode a MIMO transmission 105 for transmission to one or more receiving stations, such as receiving station 204, and receiving station 204 is configured to provide channel feedback to the transmitting station for use in precoding the MIMO transmission 105. In some embodiments, the channel feedback may comprise a quantized differential channel matrix. In other embodiments, the channel feedback may comprise a quantized differential beamforming matrix.

The transmitting station 202 may include, among other things, precoding circuitry 206 to precode transmissions to one or more receiving stations based on channel feedback. As discussed in more detail below, the channel feedback may comprise quantized differential channel matrices or quantized differential beamforming matrices. In some embodiments, the channel matrices or beamforming matrices may be quantized differentially in frequency (across two or more subcarriers). In some other embodiments, the channel matrices or beamforming matrices may be quantized differentially across time (e.g., over time samples taken at different times). In some other embodiments, the channel matrices or beamforming matrices may be quantized differentially in both frequency and time to further reduce feedback.

The receiving station 204 may include, among other things, channel estimator 208 to generate a channel estimate or channel state information in the form of a channel matrix based on signals transmitted by the transmitting station 202. The receiving station 204 may also include differential quantization circuitry 210 to generate quantized differential channel matrices or quantized differential beamforming matrices as discussed herein for transmission to the transmitting station 202 as channel feedback 103. The receiving station 204 may also include physical-layer circuitry to transmit the quantized differential channel feedback 103 to the transmitting station 202 for use in precoding information within the MIMO transmission 105 for subsequent receipt by the receiving station 204.

In OFDM systems, a strong correlation generally exists between the channel matrices of adjacent subcarriers as well as between the beamforming matrices of adjacent subcarriers even when the subcarriers are four subcarriers apart. Embodiments exploit this correlation in frequency to reduce feedback overhead and quantization complexity by employing differential quantization. Some embodiments exploit this correlation for channel matrix feedback, and other embodiments, exploit this correlation for beamforming matrix feedback.

In these embodiments that employ differential quantization, the input for quantization is compared to a reference and the difference between the input and the reference is computed and quantized. To reconstructing the input, the quantized difference may be combined with the reference. In some embodiments, differential quantization may be recursively employed for increased accuracy. In these embodiments, a reconstructed input may be used as a refined reference to compute the residual difference. The residual difference may then be quantized again for constructing a finer reference.

In embodiments that employ differential quantization for either the channel matrix or the beamforming matrix, the difference between the current and the previous matrices is quantized and fed back from the receiving station 204 to the transmitting station 202. Since the difference is generally small between adjacent subcarriers, the quantization complexity and feedback overhead are low.

In some embodiments, a full quantization of either the channel matrix or the beamforming matrix may be performed and fed back to the transmitting station 202. Although the full quantization can be performed using a quantization codebook other than the codebook for the subsequent differential feedbacks, the full quantization can be performed by recursively applying the differential quantization. In these embodiments, a constant matrix (e.g. all zero matrix or the first columns of the identity matrix) may be used as the initial reference. A differential codebook may be then used to quantize the difference between the initial reference and the input matrix to obtain a refined reference. The difference between the refined reference and the matrix may be recursively quantized for several iterations (e.g., for 2-4 iterations). The quantization indexes may be fed back to the transmitting station 202 for reconstructing the input matrix.

Differential Quantization of the Channel Matrix

Although feedback of the channel matrix is supported in IEEE 802.11n, the amount feedback overhead to support this is large, (e.g., 3000 bits for 4×2 40-MHz MIMO channel). In accordance with embodiments, this feedback is reduced by a factor of up to three times without additional complexity and with little hardware changes. In these embodiments, differential quantization may be applied across frequency for each entry of the channel matrix. In this way, joint quantization for the entire channel matrix is not needed.

For example, the entry on the $i^{th}$ row and $j^{th}$ column of the channel matrix on $f^{th}$ sampled subcarrier may be denoted as $h_{ij}(f)$. Differential quantization may be across $h_{ij}(f)$ for $f=0, \ldots, F$, as described below.

1. Normalization of the Channel Matrices:

In some embodiments, N×M channel matrices measured in frequency domain may be normalized. In some embodiments, the mean of the magnitudes of channel change across adjacent sampled subcarriers may be used for channel matrix normalization. For simplicity, the channel matrices may be normalized according to channel statistics of the first subcarrier (e.g., the mean power). In some alternate embodiments, instead of normalizing the channel matrices, the differential codebook may be scaled. In these alternate embodiments, a scaling factor is computed from statistics of channel changes across adjacent subcarriers. The differential codebook may be multiplied by the scaling factor so that a predesigned, normalized differential codebook is obtained for application to the channel matrix, whose magnitude may dynamically changes over time. In these embodiments, N may represent the number of antennas used by the transmitting station and M may represent the number of antennas used by the receiving station. N and M may range from one to eight or more.

2. Recursive Quantization:

Using zero as the initial reference, the channel matrix of the first subcarrier may be recursively quantized in the frequency domain by updating the reference and quantizing the difference.

To update the reference: $h_{ef}^k(0) = h_{ef}^{k-1}(0) + d_{ef}^{k-1}(0)$, for $k=2, \ldots K$, where k is the index of iteration; (0) is the index for the first quantized subcarrier; $h_{ef}^1(0)=0$ is the initial reference for differential quantization; $d_{ef}^{k-1}(0)$ is the quantized difference for the $(k-1)^{th}$ iteration; $h_{ef}^{-k}(0)$ is essentially the reconstructed channel entry after k-1 iterations.

The difference is quantized using the following equation: $d_{ef}^k(0) = \text{argmin}_{d \in C_d} \|h_{ef}(0) - h_{ef}^{-5}(0) - d\|$, where $C_d$ represents the differential codebook with quantization codewords (e.g. QPSK constellation points). The difference (i.e., the differential codeword under test) may be added to the reference and then the sum may be compared to the current channel as described by the above equation. This operation may be similar to comparing each point in the QPSK constellation to the difference between the channel matrix entry and the reference, however comparing each point in the QPSK constellation to the difference between the channel matrix entry and the reference may result in performance degradation.

3. Quantize Channel Entry:

Using the reconstructed entry of the previous subcarrier as the reference, the channel entry of the current subcarrier may be quantized as $d_{ef}(f) = \text{argmin}_{d \in C_d} \|h_{ef}(f) - h_{ef}(f-1) - d\|$ and $h_{ef}(f) = h_{ef}(f-1) + d_{ef}(f)$.

4. Feedback:

The indexes of $d_{ef}^k(0)$s and $d_{ef}(f)$s may be fed back to the transmitting station 202 for reconstructing $h_{ef}(f)$, for $f=1, \ldots, F$.

In some embodiments, the feedback overhead may be further reduced by quantizing the channel matrix of the first subcarrier entry by entry using a conventional codebook (e.g., the codebook for IEEE 802.11n or a 64-QAM constellation).

Figure 3:
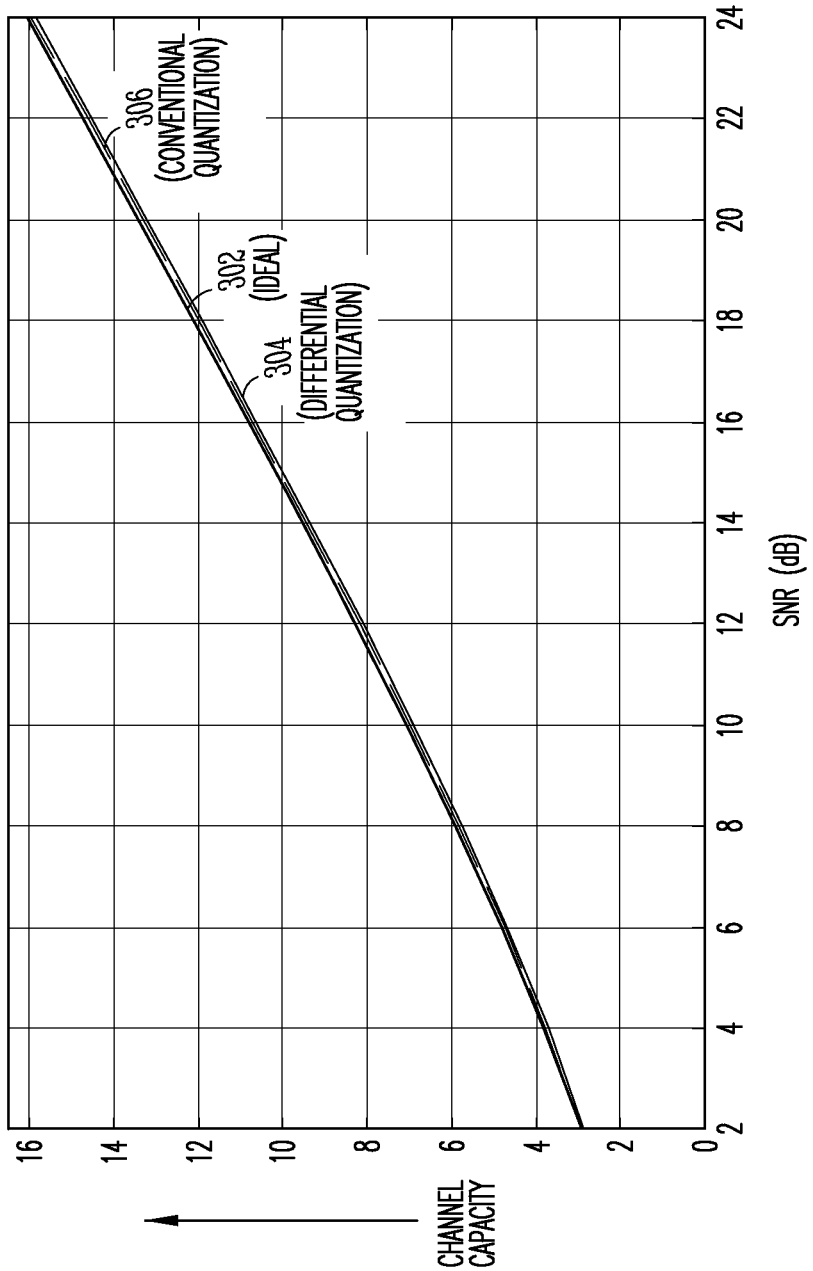
FIG. 3 shows a comparison of channel capacities for various channel feedback techniques.

FIG. 3 shows a comparison of channel capacities for various channel feedback techniques. FIG. 3 shows the channel capacity for ideal feedback 302, the channel capacity for differential quantization feedback 304 (discussed above), and the channel capacity for conventional quantization feedback 306.

The channel capacities illustrated in FIG. 3 employs an IEEE 802.11n channel model D with a non-line-of-sight (NLOS) setting and a 4×2 MIMO channel. The conventional quantization feedback 306 uses six bits to quantize each complex entry of the channel matrix. The differential quantization feedback 304 in accordance with embodiments discussed above uses two bits for each entry of the channel matrix. The channel capacity of the ideal feedback 302 has no quantization loss and is shown for comparison. As can be seen, differential quantization feedback 304 achieves similar performance to conventional quantization feedback 306, however only about one-third of the feedback overhead is needed and complexity is reduced. The reduction in performance due to either quantization scheme (differential quantization feedback 304 and conventional feedback 306) is within 2% of the ideal feedback 302.

Differential Feedback of the Beamforming Matrix

Since the feedback overhead of a beamforming matrix is generally less than half of the feedback overhead of the channel matrix, quantized differential feedback of a beamforming matrix may further reduce overhead. If each entry in the beamforming matrix varies continuously without phase flip across the subcarriers, then the scale quantization of channel matrices may also be applied to the beamforming matrices. However, the beamforming matrix obtained from conventional methods, such as by performing a singular-value decomposition (SVD), has phase flip. The phase flip may disable the smoothing process in the channel estimator at the receiver and thus reduces the channel estimation accuracy. In addition, the SVD computation is highly complex.

In accordance with some embodiments, a beamforming matrix is differentially quantized across both time and frequency. In these embodiments, the beamforming matrix is quantized with continuous phase, low complexity, and low overhead. In some embodiments, a cyclic-redundancy check (CRC) may be added to the feedback frame to help prevent error propagation. Unlike the scale quantization for the channel matrix, the beamforming matrix may be jointly quantized as a whole. The reference used for the differential quantization is a matrix, which may be unitary. In these embodiments, the reference is rotated by small angles in all directions for generating a set of candidate beamforming matrices. The performance of each candidate matrix may be checked and the candidate matrix with the best performance may be selected as the quantized beamforming matrix. This removes the need to compute the SVD of the channel matrix. Performance metrics may include channel capacity, sum signal-to-interference and noise ratio (SINR), determinant magnitude of the beam-formed channel, etc.

In these embodiments, the final selected quantized beamforming matrix may be used as the reference for a next sampled subcarrier. Since the size of the candidate set is determined by the dimension of the perturbation direction, six to eight bits of feedback per subcarrier may be sufficient for beamforming, which is much less than the 30-60 bits of feedback per subcarrier in some conventional systems, such as IEEE 802.11n systems. Accordingly, overhead for beamforming feedback may be reduced by a factor of four or more.

Furthermore, since the channel is continuous and the quantized beamforming matrices of adjacent subcarriers differ by only a small rotation, the beam-formed channel, which is the product of the channel matrix and the beamforming matrix, is continuous. Accordingly, smoothing in the channel estimator may be enabled and channel estimator performance may therefore be improved.

The following describes the generation of quantized differential beamforming matrices in accordance with some embodiments.

The channel matrix for the $f^{th}$ sampled subcarrier may be denoted by H(f) and the quantized beamforming matrix for the $f^{th}$ sampled subcarrier may be denoted by V(f). The candidate set of quantized beamforming matrices is updated as follows:

$Q(V(f-1))=[V(f-1)V^\perp(f-1)]$ and $V_l(f)=Q(V(f-1))D_l$, for l=1, ..., L, where $V^\perp(f-1)$ is an M by N-M unitary matrix with columns orthogonal to V(f-1), and L is the number of candidate matrices and may range from 32 to 256, for example.

The difference between the updated quantized beamforming matrices may be computed as follows:
$D(f)=\text{argmax}_{D \in C_D} g(H(f),Q(V(f-1))D)$, where g(A,B) is the evaluation function of the performance metric. For the channel capacity metric, $g(A,B)=\det(pAB(AB)^H+R)$, where p is normalized transmission power and R is covariance matrix of the interference plus noise. For the performance metric, $g(A,B)=\|\det(AB)\|^g$.

For the first subcarrier, the initial reference may be the first M columns of the identity matrix. After one differential quantization, the residual error between the ideal beamforming matrix and the quantized version (i.e., $a^{(1)}(f)=V(f)-V^{(1)}(f)$, for f=0) may be large. The reconstructed beamforming matrix $V^{(1)}(f)$ may then used as the reference for quantizing the same V(f) again to reduce the quantization error. This has been applied to the scalar quantization of the channel matrix and may be applied not only to the first subcarrier but also to the other subcarriers for increased accuracy. For example, the differential quantization may be recursively applied to the first subcarrier for few times (e.g. 3-5) as in the quantization of the channel matrix discussed above. For the other subcarriers, the differential quantization may, for example, run twice with few codewords for each run.

In some embodiments, to speed up the convergence in quantizing the initial beamforming of channel matrix, multiple quantization codebooks may be used. In these embodiments, a codebook with a larger correction step may be used in the initial iterations for faster convergence while a codebook with a smaller correction step may be used in latter iterations for smaller residual errors.

Time Domain Correlation

In addition to frequency domain correlation in OFDM systems, there may also be a strong correlation in the time domain. The coherence time of an OFDM channel in an IEEE 802.11ac network may be more than ten milliseconds (ms). In some embodiments, this time domain correlation is exploited to further reduce feedback overhead and/or increase beamforming accuracy. In these embodiments, the differential quantization techniques discussed above are applied to the time domain. The base of the differential computation may be the previous channel matrix or the previous beamforming matrix. Although a long coherence time reduces the feedback rate for SU-MIMO, MU-MIMO does not benefit as much because inaccurate beamforming may degrade the performance of MU-MIMO more than SU-MIMO. Therefore, embodiments disclosed herein that exploit time-domain correlation may be more desirable for use with MU-MIMO because performance may be maintained by providing less feedback more often.

In some embodiments, the channel feedback 103 (FIG. 1) may be driven by the detection of changes in channel conditions since channel variation in time is generally different for each station 104. In these embodiments, the access point 102 (FIG. 1) may monitor the channel conditions of each station 104 and may dynamically request channel feedback 103 based on the significance of a change in channel conditions. A station 104 may also monitor the channel conditions and may transmit a request for feedback once the change is significant.

In some embodiments, the receiving station 204 may be configured to provide channel feedback for an OFDM channel by performing differential quantization of channel information across at least one of time and frequency to generate quantized differential channel feedback, and transmitting the quantized differential channel feedback to the transmitting station 202 for use in precoding a MIMO transmission 105. The quantized differential channel feedback may comprise a quantized differential channel matrix or a quantized differential beamforming matrix. In some embodiments, differential quantization of channel information may be performed across both time and frequency to further reduce feedback.

The MIMO transmission 105 may be a SU-MIMO transmission, MU-MIMO transmission or a cooperative MIMO transmission. These embodiments may utilize a closed-loop MIMO technique in which either the quantized differential channel matrix or the quantized differential beamforming matrix is provided to the transmitting station 202. In cooperative MIMO embodiments, additional MIMO advantages are achieved including additional spatial multiplexing gain through the use of the transmitter/receiver cooperation of distributed antennas of the different stations 104.

The quantized differential channel matrix may comprise two to four bits for each matrix element, and the quantized differential beamforming matrix may comprise between two to twenty-one bits for each matrix. These embodiments that utilize between two to twenty-one bits for each matrix may be applicable to 2×1, 2×2, 3×1, 3×2, ..., 4×2 beamforming matrices. Additional bits may be used for larger matrices, such as 8×1, 8×2, ... sized matrices.

To generate the quantized differential channel matrix, the receiving station 204 may either normalize the channel matrix for a first subcarrier in the frequency domain and use a differential codebook to recursively quantize the difference between the normalized channel matrix for the first subcarrier and an initial reference matrix, or may scale the differential codebook to match a channel magnitude and use the scaled differential codebook to recursively quantize the difference between the channel matrix for the first subcarrier and the initial reference matrix. Because each differential codebook may have a limited range in values (e.g., 0.1-0.3), a differential codebook may be designed for normalized channels in which the average channel power (or standard deviation) is unity. If the input channels are initially scaled-up by an automatic gain control (AGC) or have augmented signal strength, the channel inputs may be scaled-down to properly apply a differential codebook. In accordance with embodiments, either the input channels are scaled or the differential codebook is scaled so the channel and codebook match. Scaling the differential codebook may utilize fewer multiplications because of its smaller size. Normalization of the channel matrices, may, for example, comprise dividing all channel entries by the standard deviation that is computed from all the channel entries across subcarriers and antenna pairs. Other techniques may be used to normalize a channel matrix.

In some embodiments, recursively quantizing may include iteratively updating the initial reference matrix for a number of iterations based on the difference between a previously updated reference matrix and the channel matrix for the first subcarrier to obtain a refined reference matrix, and quantizing the difference between each subsequent refined reference matrix and the channel matrix to generate quantization indices for the first subcarrier. The initial reference matrix is initially a constant matrix, which may comprise either a matrix of all zeros or a matrix having the first columns of an identity matrix. The quantization indices are fed back to the transmitting station 202 for reconstruction of the channel matrix. A quantization index may correspond to one entry in the channel matrix. Each quantization index may be two to four bits, instead of 8 to 16 bits in the case of conventional quantization.

In some embodiments, the receiving station 204 may quantize the difference between a channel entry in the channel matrix for a current subcarrier and a reconstructed channel entry of a prior subcarrier to generate quantization indices for the current subcarrier that are to be fed back to the transmitting station 202. The prior subcarrier may be initially the first subcarrier.

To perform differential quantization across frequency, the current subcarrier and the prior subcarrier may be non-adjacent subcarriers and may be separated by one or more intervening subcarriers. In these embodiments, the receiving station 204 may refrain from performing differential quantization on the intervening subcarriers. In these embodiments, there may be up to four or more intervening subcarriers to exploit the frequency domain correlation between channel matrices of nearby subcarriers. In some embodiments, differential quantization may also be performed across time for subsequent samples of a subcarrier. In some embodiments, the receiving station 204 may be configured to initially quantize the channel matrix for the first subcarrier in an entry-by-entry manner using a conventional quantization codebook with a 64-QAM constellation.

In embodiments in which the receiving station 204 is configured to generate a quantized differential beamforming matrix, the receiving station 204 may generate a candidate set of quantized beamforming matrices by rotating initial beamforming matrices in the differential codebook to center around the initial reference beamforming matrix. The receiving station 204 may also evaluate the performance of at least some of the candidate matrices, and may select one of the candidate matrices based on the evaluated performance. The receiving station 204 may use the selected candidate matrix as a refined reference matrix for further iterations of either a current subcarrier (for differential quantization across time) or a next subcarrier (for differential quantization across frequency).

To perform differential quantization across frequency for generating the quantized differential beamforming matrix, the receiving station 204 may be configured to use the selected candidate matrix as the refined reference matrix for further iterations for differential quantization of the next subcarrier. The next subcarrier may be separated by one or more intervening subcarriers from a prior subcarrier.

To perform differential quantization across time for generating the quantized differential beamforming matrix, the receiving station 204 may be configured to use the selected candidate matrix as the refined reference matrix for further iterations for differential quantization of subsequent samples of the same subcarrier.

Some embodiments are directed to a method for performing differential quantization of channel information to generate a quantized differential beamforming matrix for MIMO communications over an OFDM channel. The method may comprise generating a candidate set of quantized beamforming matrices by rotating initial beamforming matrices in a differential codebook to center around an initial reference beamforming matrix, evaluating performance of at least some of the quantized beamforming matrices of the candidate set, selecting one of the quantized beamforming matrices of the candidate set based on the evaluated performance, and performing further iterations of the generating, evaluating and selecting using a prior selected quantized beamforming matrix from a prior iteration as a refined reference beamforming matrix for each subsequent iteration. In these embodiments, the refined reference beamforming matrix used in each subsequent iteration may be used in place of the initial reference beamforming matrix for generating the set of quantized beamforming matrices in each subsequent iteration.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by a receiving station for providing channel feedback for an orthogonal frequency division multiplexed (OFDM) channel, the method comprising:
    performing recursive differential quantization of channel information across at least one of time and frequency to generate quantized differential channel feedback; and
    transmitting the quantized differential channel feedback to a transmitting station for use in precoding a multiple-input multiple-output (MIMO) transmission,
    wherein the quantized differential channel feedback comprises one of a quantized differential channel matrix and a quantized differential beamforming matrix, and
    wherein performing the recursive differential quantization includes iteratively updating an initial reference matrix for a number of iterations based on a difference between a previously updated reference matrix and a channel matrix.

2. The method of claim 1 wherein the MIMO transmission is one of a single-user MIMO transmission, multiple-user MIMO transmission or a cooperative MIMO transmission, and
    wherein the quantized differential channel matrix comprises two to four bits for each matrix element, and
    wherein the quantized differential beamforming matrix comprises between two to twenty-one bits for each matrix.

3. A method performed by a receiving station for providing channel feedback for an orthogonal frequency division multiplexed (OFDM) channel, the method comprising:
    performing recursive differential quantization of channel information across at least one of time and frequency to generate quantized differential channel feedback; and transmitting the quantized differential channel feedback to a transmitting station for use in precoding a multiple-input multiple-output (MIMO) transmission,
wherein the quantized differential channel feedback comprises one of a quantized differential channel matrix and a quantized differential beamforming matrix,
wherein to generate the quantized differential channel matrix, the method comprises either:
normalizing a channel matrix for a first subcarrier in the frequency domain and using a differential codebook to recursively quantize a difference between the normalized channel matrix for the first subcarrier and an initial reference matrix; or
scaling the differential codebook to match a channel magnitude and using the scaled differential codebook to recursively quantize a difference between the channel matrix for the first subcarrier and the initial reference matrix.

4. The method of claim 3 wherein recursively quantizing includes:
iteratively updating the initial reference matrix for a number of iterations based on a difference between a previously updated reference matrix and the channel matrix for the first subcarrier to obtain a refined reference matrix; and
quantizing a difference between each subsequent refined reference matrix and the channel matrix to generate quantization indices for the first subcarrier,
wherein the initial reference matrix is initially a constant matrix.

5. The method of claim 3 further comprising quantizing a difference between a channel entry in the channel matrix for a current subcarrier and a reconstructed channel entry of a prior subcarrier to generate quantization indices for the current subcarrier that are to be fed back to the transmitting station,
wherein the prior subcarrier is initially the first subcarrier.

6. The method of claim 5 wherein for performing differential quantization across frequency, the current subcarrier and the prior subcarrier are non-adjacent subcarriers and are separated by one or more intervening subcarriers, and
wherein the method comprises refraining from performing the differential quantization on the intervening subcarriers.

7. The method of claim 6 further comprising performing differential quantization across time for subsequent samples of a subcarrier.

8. The method of claim 5 further comprising initially quantizing the channel matrix for the first subcarrier in an entry-by-entry manner using a conventional quantization codebook with a 64-QAM constellation.

9. The method of claim 1 wherein to generate the quantized differential beamforming matrix, the method comprises:
generating a candidate set of quantized beamforming matrices by rotating initial beamforming matrices in the differential codebook to center around the initial reference beamforming matrix;
evaluating performance of at least some of the candidate matrices; and
selecting one of the candidate matrices based on the evaluated performance and using the selected candidate matrix as a refined reference matrix for further iterations of either a current subcarrier or a next subcarrier.

10. The method of claim 9 wherein to perform differential quantization across frequency for generating the quantized differential beamforming matrix, the method comprises using the selected candidate matrix as the refined reference matrix for further iterations for differential quantization of the next subcarrier, the next subcarrier being separated by one or more intervening subcarriers from a prior subcarrier.

11. The method of claim 9 wherein to perform differential quantization across time for generating the quantized differential beamforming matrix, the method comprises using the selected candidate matrix as the refined reference matrix for further iterations for differential quantization of subsequent samples of a same subcarrier.

12. The method of claim 9 further comprising adding a cyclic-redundancy check (CRC) to frames that comprise the quantized differential beamforming matrix for transmission to the transmitting station.

13. A method performed by a receiving station for providing channel feedback for an orthogonal frequency division multiplexed (OFDM) channel, the method comprising:
performing recursive differential quantization of channel information across at least one of time and frequency to generate quantized differential channel feedback; and
transmitting the quantized differential channel feedback to a transmitting station for use in precoding a multiple-input multiple-output (MIMO) transmission,
wherein the quantized differential channel feedback comprises one of a quantized differential channel matrix and a quantized differential beamforming matrix,
wherein the MIMO transmission is a multi-user MIMO transmission that comprises a concurrent transmission of spatially-separated data packets by the transmitting station to two or more receiving stations, and
wherein each of the spatially-separated data packets are precoded for receipt by an associated one of the receiving stations based on quantized differential channel feedback provided by the associated receiving station.

14. A receiving station configured to provide channel feedback for multiple-input multiple-output (MIMO) communications over an orthogonal frequency division multiplexed (OFDM) channel, the receiving station comprising:
differential quantization circuitry to recursively quantize differential channel information across one of time and frequency to generate quantized differential channel feedback; and
circuitry to transmit the quantized differential channel feedback to a transmitting station for use in precoding a MIMO transmission for subsequent receipt by the receiving station,
wherein the quantized differential channel feedback comprises one of a quantized differential channel matrix and a quantized differential beamforming matrix,
wherein the differential quantization circuitry is configured to either:
normalize a channel matrix for a first subcarrier in the frequency domain and using a differential codebook to recursively quantize a difference between the normalized channel matrix for the first subcarrier and an initial reference matrix; or
scale the differential codebook to match a channel magnitude and using the scaled differential codebook to recursively quantize a difference between the channel matrix for the first subcarrier and an initial reference matrix.

15. The receiving station of claim 14 wherein the differential quantization circuitry is configured to recursively quantize by:
iteratively updating the initial reference matrix for a number of iterations based on a difference between a previously updated reference matrix and the channel matrix for the first subcarrier to obtain a refined reference matrix; and quantizing a difference between each subsequent refined reference matrix and the channel matrix to generate quantization indices for the first subcarrier,
wherein the initial reference matrix is initially a constant matrix.

16. The receiving station of claim 14 wherein the differential quantization circuitry is further configured to quantize a difference between a channel entry in the channel matrix for a current subcarrier and a reconstructed channel entry of a prior subcarrier to generate quantization indices for the current subcarrier that are to be fed back to the transmitting station,
wherein the prior subcarrier is initially the first subcarrier.

17. The receiving station of claim 14 wherein to generate the quantized differential beamforming matrix, the differential quantization circuitry is configured to:
generate a candidate set of quantized beamforming matrices by rotating initial beamforming matrices in the differential codebook to center around the initial reference beamforming matrix;
evaluate performance of at least some of the candidate matrices; and
select one of the candidate matrices based on the evaluated performance and using the selected candidate matrix as a refined reference matrix for further iterations of either a current subcarrier or a next subcarrier.

18. A method for performing differential quantization of channel information to generate a quantized differential channel matrix for multiple-input multiple-output (MIMO) communications over an orthogonal frequency division multiplexed (OFDM) channel, the method comprising:
either normalizing a channel matrix for a first subcarrier in the frequency domain and using a differential codebook to recursively quantize a difference between the normalized channel matrix for the first subcarrier and an initial reference matrix; or
scaling the differential codebook to match channel magnitude and using the scaled differential codebook to recursively quantize a difference between the channel matrix for the first subcarrier and the initial reference matrix, and
iteratively updating the initial reference matrix for a number of iterations based on a difference between a previously updated reference matrix and the channel matrix for the first subcarrier to obtain a refined reference matrix; and
quantizing a difference between each subsequent iteratively updated refined reference matrix and the channel matrix to generate quantization indices for the first subcarrier,
wherein the initial reference matrix is initially a constant matrix.

19. The method of claim 18 further comprising quantizing a difference between a channel entry in the channel matrix for a current subcarrier and a reconstructed channel entry of a prior subcarrier to generate the quantization indices for the current subcarrier that are to be fed back to the transmitting station,
wherein the prior subcarrier is initially the first subcarrier.

20. The method of claim 19 wherein the differential quantization of channel information is performed across frequency such that the current subcarrier and the prior subcarrier are non-adjacent subcarriers and are separated by one or more intervening subcarriers, and
wherein the method comprises refraining from performing the differential quantization on the intervening subcarriers.

21. The method of claim 20 further comprising performing differential quantization of the channel information across time for subsequent samples of a subcarrier to generate quantization indices that represent quantized differences in elements of the channel matrix across time and frequency.

22. A method for performing differential quantization of channel information to generate a quantized differential beamforming matrix for multiple-input multiple-output (MIMO) communications over an orthogonal frequency division multiplexed (OFDM) channel, the method comprising:
generating a candidate set of quantized beamforming matrices by rotating initial beamforming matrices in a differential codebook to center around an initial reference beamforming matrix;
evaluating performance of at least some of the quantized beamforming matrices of the candidate set;
selecting one of the quantized beamforming matrices of the candidate set based on the evaluated performance; and
performing further iterations of the generating, evaluating and selecting using a prior selected quantized beamforming matrix from a prior iteration as a refined reference beamforming matrix for each subsequent iteration.

23. The method of claim 22 wherein the further iterations are performed for either a predetermined number of further iterations or until a predetermined performance criteria is met.

24. The method of claim 23 further comprising performing a differential quantization across frequency to generate a quantized differential beamforming matrix for an initial subcarrier by using the selected quantized beamforming matrix as the refined reference beamforming matrix for further iterations for a next subcarrier, the next subcarrier being separated by one or more intervening subcarriers from a prior subcarrier.

25. The method of claim 24 further comprising performing a differential quantization across time to generate a quantized differential beamforming matrix for a current subcarrier using the selected quantized beamforming matrix as the refined reference beamforming matrix for further iterations of subsequent samples of the subcarrier.

26. The method of claim 25 further comprising adding a cyclic-redundancy check (CRC) to frames that comprise each subsequent quantized differential beamforming matrix that is to be transmitted to a transmitting station.

* * * * *